United States Patent
DeLuca et al.

(10) Patent No.: US 10,608,896 B2
(45) Date of Patent: Mar. 31, 2020

(54) ENFORCE PRE-OPTIMIZED SERVICE CONTRACTS ASSOCIATED WITH CONTAINERS

(71) Applicant: International Business Machines Corporation, Armonk, NY (US)

(72) Inventors: Lisa Seacat DeLuca, Baltimore, MD (US); Nitin Gaur, Round Rock, TX (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 15/348,872

(22) Filed: Nov. 10, 2016

(65) Prior Publication Data

US 2018/0131581 A1    May 10, 2018

(51) Int. Cl.
*H04L 12/24* (2006.01)
*G06F 15/76* (2006.01)
*G06F 9/00* (2006.01)

(52) U.S. Cl.
CPC .......... *H04L 41/5009* (2013.01); *G06F 15/76* (2013.01); *H04L 41/50* (2013.01); *H04L 41/5003* (2013.01); *H04L 41/5019* (2013.01); *H04L 41/5025* (2013.01); *G06F 9/00* (2013.01)

(58) Field of Classification Search
CPC . G06F 9/00; G06F 15/76; H04L 41/50; H04L 41/5003; H04L 41/5009; H04L 41/5019; H04L 41/5025
See application file for complete search history.

(56) References Cited

U.S. PATENT DOCUMENTS

| | | | |
|---|---|---|---|
| 8,285,681 B2 | 10/2012 | Prahlad et al. | |
| 9,805,345 B1* | 10/2017 | Dailianas | G06Q 20/102 |
| 9,888,067 B1* | 2/2018 | Yemini | H04L 67/1023 |
| 10,162,714 B2 | 12/2018 | Hohl et al. | |
| 10,367,914 B2 | 7/2019 | Narasimhan et al. | |
| 2012/0130936 A1* | 5/2012 | Brown | G06N 5/048 706/52 |
| 2014/0317293 A1* | 10/2014 | Shatzkamer | G06F 9/455 709/226 |
| 2015/0074279 A1 | 3/2015 | Maes et al. | |
| 2016/0173641 A1 | 6/2016 | Broussard et al. | |
| 2016/0344595 A1 | 11/2016 | Jain et al. | |
| 2017/0353361 A1* | 12/2017 | Chopra | H04L 41/147 |
| 2018/0004499 A1* | 1/2018 | Ghosh | G06F 9/5083 |
| 2018/0109464 A1* | 4/2018 | Chen | H04L 47/70 |

OTHER PUBLICATIONS

"What is Docker?," Docker, Inc., 2016, 7 pages.
Bryant, "Searching for the Right Abstraction in a Microservice Platform. Q&A with VAMP creator Olaf Molenveld," Infoq.com, May 2016, 11 pages.

* cited by examiner

*Primary Examiner* — Gil H. Lee
(74) *Attorney, Agent, or Firm* — VanLeeuwen & VanLeeuwen; Christopher M. Pignato

(57) ABSTRACT

An approach is provided in which an information handling system deploys a container into a container group. The container includes service level information corresponding to a service level. A process executing within the container group analyzes the service level information against status data corresponding to the container group and performs a service-related action to enforce the service level within the container group based on the analysis.

14 Claims, 6 Drawing Sheets

ENFORCE PRE-OPTIMIZED SERVICE CONTRACTS ASSOCIATED WITH CONTAINERS

BACKGROUND

The present disclosure relates to a container group autonomously enforcing service levels based on service level information included in containers.

Container technology transforms an application into a lightweight, portable, self-sufficient unit that executes on a host system independent of the host system's installed operating system and applications. Containers provide an additional layer of protection that isolates a container from other containers and the host without using incremental resources of the underlying infrastructure. The nature of containers also facilitates a fast and easy application of patches and updates to the container's operating system, applications, and infrastructure layers, which help maintain overall security compliance. "Docker" is an example of container technology, which is an open platform to build, ship, and run distributed applications. Organizations utilize Docker to simplify and accelerate their application development and deployment process.

Service level agreements (SLA) are agreements between a service level provider and a customer that specify a level of service, such as a level of quality (data rates, throughput, jitter, etc.), availability, responsibilities, etc. Organizations that deploy applications using container technology may also wish to assign particular service levels to the deployed applications.

BRIEF SUMMARY

According to one embodiment of the present disclosure, an approach is provided in which an information handling system deploys a container into a container group. The container includes service level information corresponding to a service level. A process executing within the container group analyzes the service level information against status data corresponding to the container group and performs a service-related action to enforce the service level within the container group based on the analysis.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
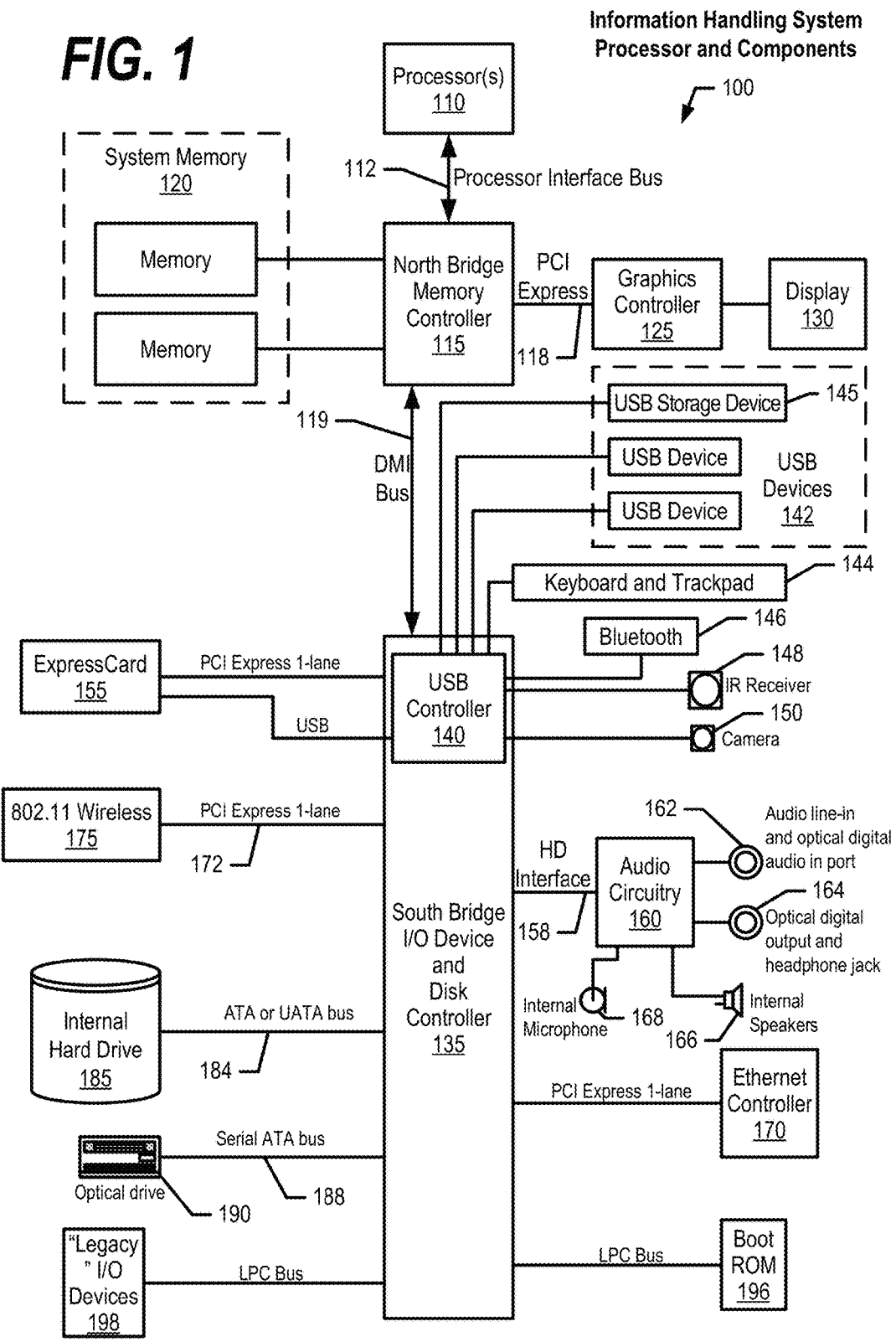
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
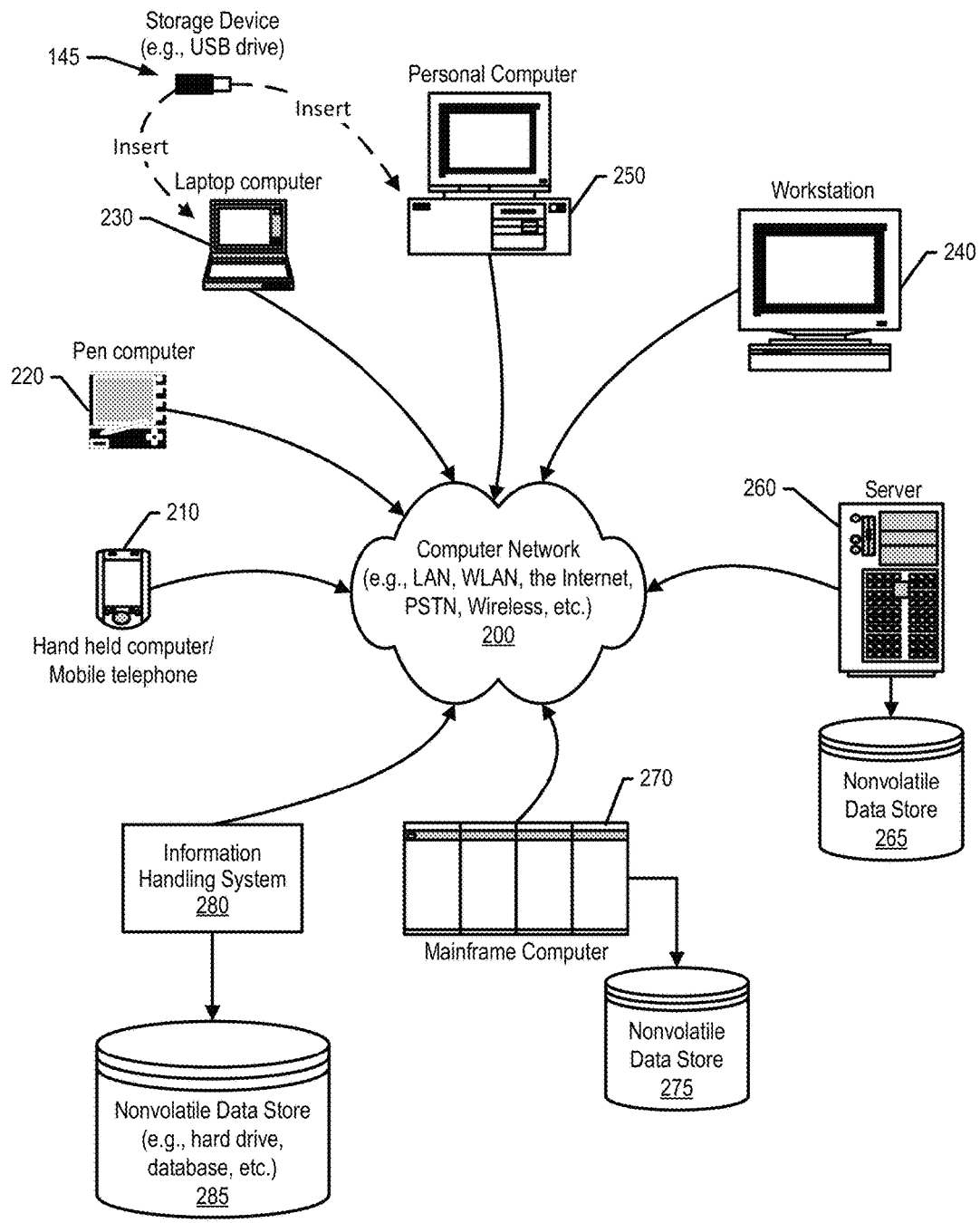
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system. The information handling system incorporates service level information into containers so that the service level information stays with the container when the container is deployed to a container group. In one embodiment, the container group includes a distributed ledger each container reads/writes status data from/to the distributed ledger. In this embodiment, an authorization watchdog executing within the container group analyzes the status data against the service level information to determine whether to perform service-related actions, such as terminating containers with the container group if too many containers have been instantiated. Due to the independent and self-contained nature of the way in which the container groups enforce service levels, the container groups are able to operate in a de-coupled environment without a centralized system involved to enforce the service levels.

Figure 3:
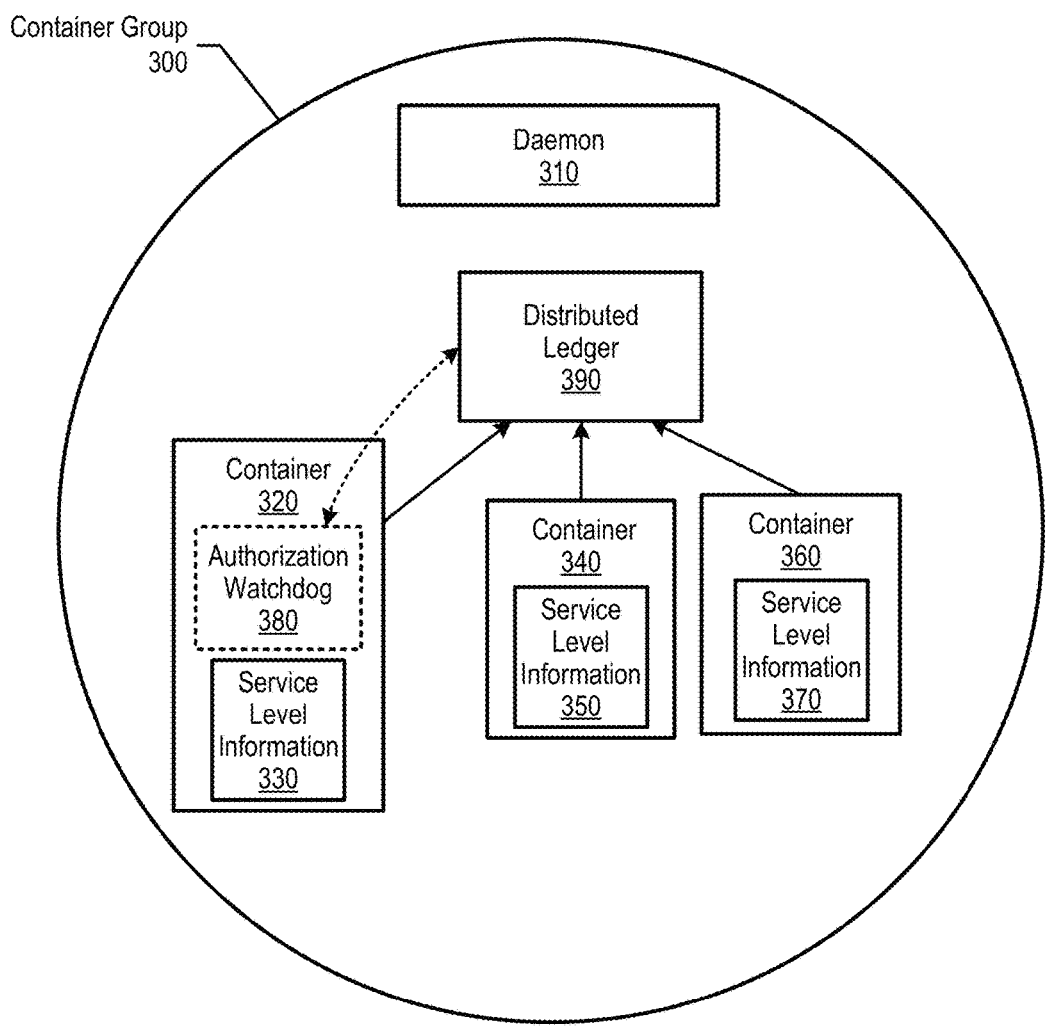
FIG. 3 is a high-level diagram showing a container group that includes a distributed ledger and an authorization watchdog process that ensures the container group and included containers adhere to specific service levels.

FIG. 3 is a high-level diagram showing a container group that includes a distributed ledger and an authorization watchdog process that ensures the container group and included containers adhere to specific service levels. As discussed below and shown in FIG. 4, containers 320, 340, and 360 are instantiated from encapsulated service image 415, which includes service contracts 420 corresponding to service policies 405. When containers 320, 340, and 360 are deployed into container group 300, each container includes service level information (330, 350, and 370) generated from service contracts 420.

FIG. 3 shows that container group 300 also includes daemon 310 and distributed ledger 390. Distributed ledger 390 is a distributed repository of status data that is accessible by each container in container group 300. Authorization watchdog 380, for example, is a process that monitors the status data in distributed ledger 390 and evaluates the status data against the service level information to ensure that container group 300 and its containers adhere to service levels corresponding to the service level information. For example, the service level information may state that 20 containers are allowed in a container group and the status data indicates that 21 containers are currently operating. In this example, authorization watchdog 380 may invoke steps to terminate one of the containers from container group 300.

Figure 4:
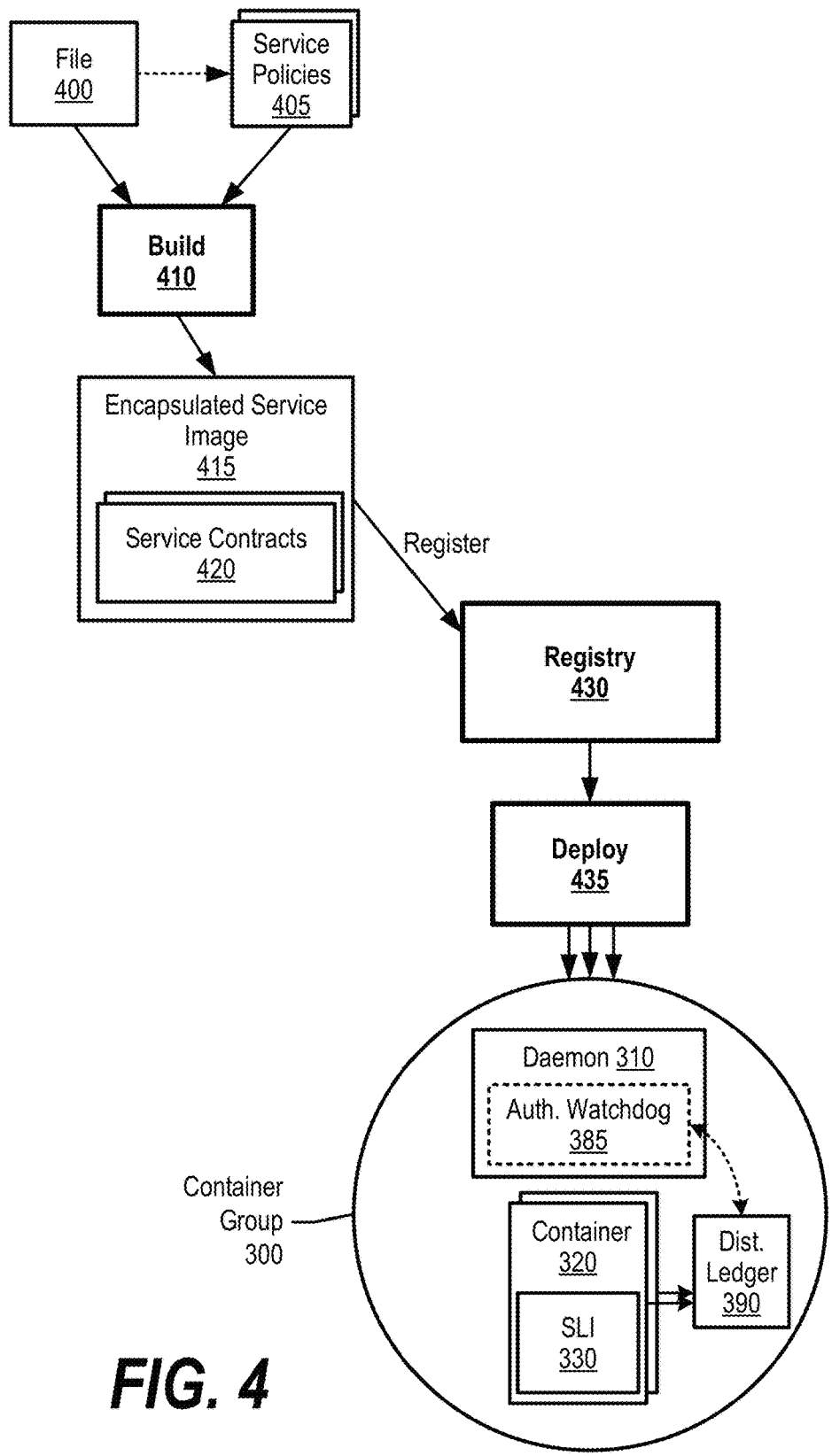
FIG. 4 is a high-level diagram showing an approach to generating an encapsulated service image that includes service policies and deploying containers from the encapsulated service image.

Authorization watchdog 380 may execute on any one of the containers within container group 300. Authorization watchdog 380 may also execute on daemon 310 as shown in FIG. 4. In one embodiment, daemon 310 controls on which entity authorization watchdog 380 executes. For example, if container 320 terminates, daemon 310 may invoke authorization watchdog 380 on container 340.

FIG. 4 is a high-level diagram showing an approach to generating an encapsulated service image that includes service policies and deploying containers from the encapsulated service image.

File 400 is a container file that, in one embodiment, is a text document that includes commands to build an image. File 400 includes references, or pointers, to service policies 405. Service policies 405 includes policies such as dependency-based policies, minimum/maximum scaling policies, etc. For example, service policies may include dependency-based deployment policies such as "Deploy Service (A) only if Service (B) Version 1 is deployed" or "Deploy the container group ONLY if the resources for the maximum number of containers are available."

During the image build process (build 410) the information handling system accesses file 400 and builds encapsulated service image 415, which is a container image (e.g., Docker container) that includes service level information (service contracts 420) based on service policies 405. For example, service contracts 420 may include service level information to address scale such as a minimum number of containers required in a container group to handle a minimum number of sessions. Service contracts 420 may also include service level information to address dependency such as requiring scalability of a container group similar to that of dependent container groups.

Encapsulated service image 415 registers with registry 430. Once registered, containers 320, 340, and 360 are instantiated from encapsulated service image 415 and deployed (deploy 435) into container group 300 accordingly.

Daemon 310 is a process within container group 440 and, in the embodiment shown in FIG. 4, executes authorization watchdog 385. Authorization watchdog 385 may also execute on one of the containers and, as discussed earlier, authorization watchdog 385 analyzes the status data in distributed ledger 390 against service level information 330 instantiated from service contracts 420 to carry out service-related actions accordingly.

Figure 5:
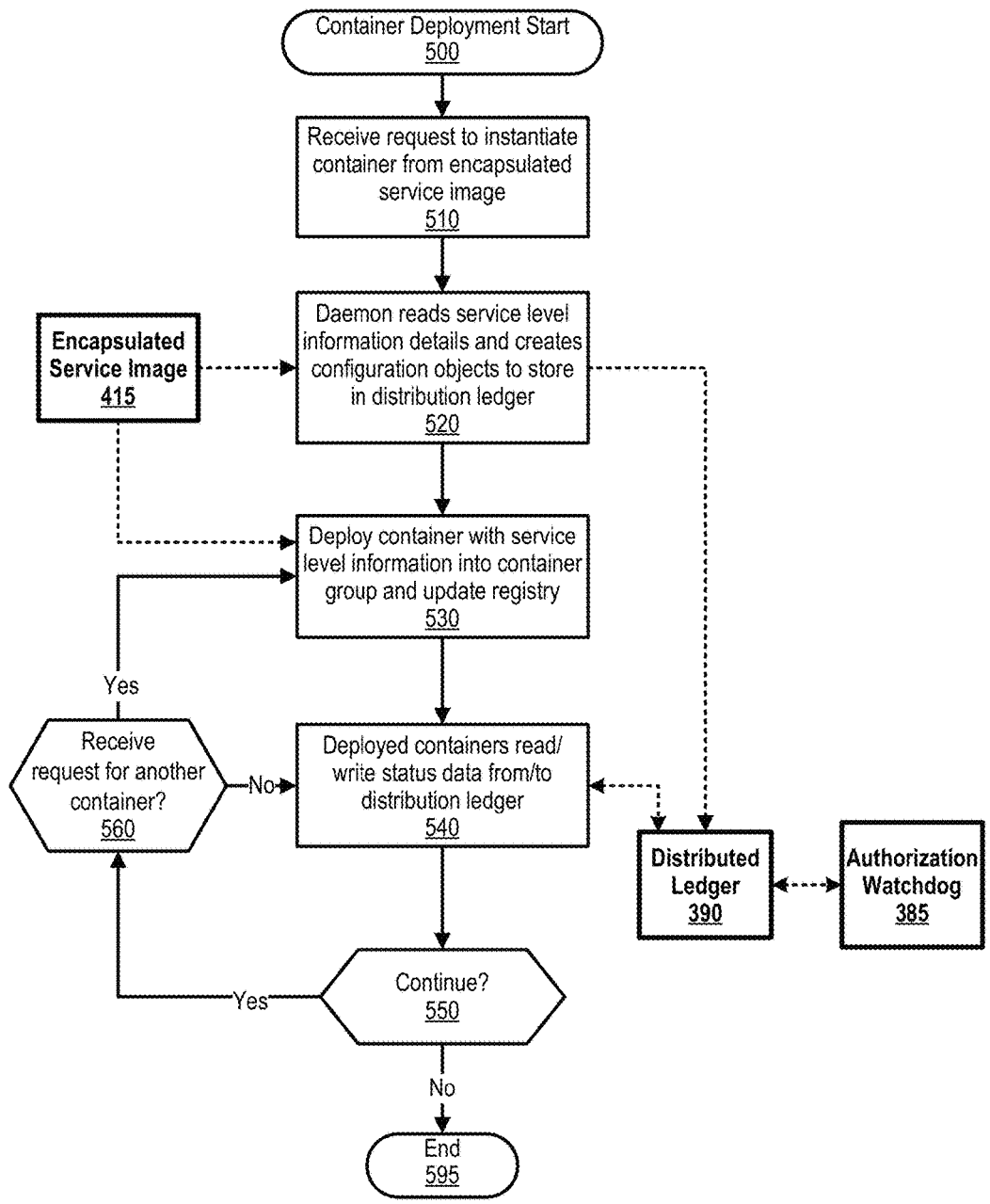
FIG. 5 depicts a flowchart showing steps taken to deploy containers into a container group and the containers writing status data into a distributed ledger.

FIG. 5 depicts a flowchart showing steps taken to deploy containers into a container group and the containers writing status data into a distributed ledger. FIG. 5 processing commences at 500 whereupon, at step 510, the process receives a request to instantiate a container from encapsulated service image 415. At step 520, the process reads service level information in service contracts 420 and creates configuration objects to store in distribution ledger. The configuration objects may include information such as a number of sessions per active container, time to live per session, membership count per container group, time to live of container, etc. In one embodiment, the process reads the service level information from an instantiated container, such as from service level information 330 shown in FIG. 3.

At step 530, the process deploys a container into the container group and updates registry 430 accordingly. At step 540, the containers deployed into the container group read/write status data from/to distribution ledger 390. The status data may include a number of sessions per container, time to live per session, membership count per container group, time to live of container, etc. The process determines as to whether to continue, such as determining whether the container group is still active (decision 550). If the process should continue, then decision 550 branches to the 'yes' branch whereupon the process determines as to whether a container request is received to deploy another container (decision 560). If a container request is received to deploy another container, then decision 560 branches to the 'yes' branch whereupon another container is deployed into the container group (step 530). On the other hand, if a request was not received to deploy another container, then decision 560 branches to the 'no' branch whereupon the currently deployed containers continue to read/write status data to distributed ledger 390. When the process determines to terminate, decision 550 branches to the 'no' branch and FIG. 5 processing thereafter ends at 595.

Figure 6:
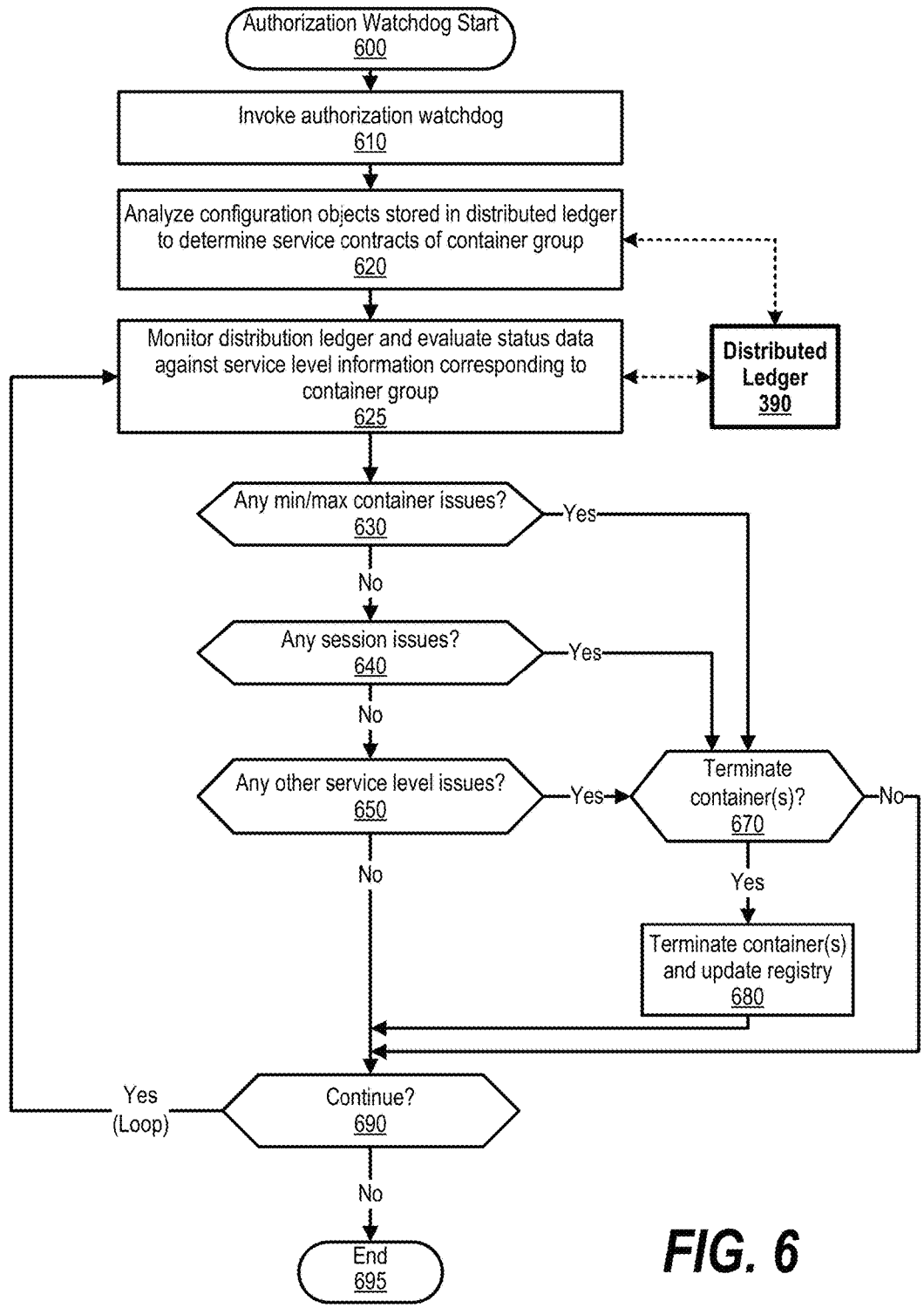
FIG. 6 depicts a flowchart showing steps taken by an authorization watchdog process to enforce a service level within a container group according to service level information included in a container.

FIG. 6 depicts a flowchart showing steps taken by an authorization watchdog process to enforce a service level within a container group according to service level information included in a container. FIG. 6 processing commences at 600 whereupon, at step 610, the process invokes an authorization watchdog, which is a process internal to the container group and may execute on entities such as one of container group 300's containers or daemon 310.

At step 620, the process analyzes configuration objects, stored in distributed ledger 390 during step 520 in FIG. 5, to determine service levels of the container group. For example, service level information in the configuration objects may indicate a maximum number of containers allowed to execute at one time within a container group, or may indicate a maximum number of sessions of a container.

At step 625, the process monitors distribution ledger 390 and evaluates the status data against the service level information. The process determines as to whether any min/max container issues have surfaced, such as the amount of containers deployed into the container group exceeding the maximum number of containers specified in the service level information (decision 630). If any min/max container issues have surfaced, then decision 630 branches to the 'yes' branch.

The process then determines as to whether terminate container(s) from the container group (decision 670). For example, the process may terminate the most recently deployed containers until the number of containers is reduced to the maximum number of allowable containers. In another example, the process may terminate the least utilized containers until the number of containers is reduced to the maximum number of allowable containers. If the process should terminate container(s), then decision 670 branches to the 'yes' branch whereupon, at step 680, the process terminates the container(s) and updates registry 430 accordingly.

Referring back to decision 630, if the process does not detect any min/max container issues, then decision 630 branches to the 'no' branch whereupon the process determines as to whether there any session issues, such as too many sessions relative to an amount of sessions specified by the service level information (decision 640). If there are any session issues, then decision 640 branches to the 'yes' branch whereupon the process determines whether to terminate container(s) and, in turn, terminates the container(s) accordingly as discussed above.

On the other hand, if there are not any session issues, then decision 640 branches to the 'no' branch whereupon the process determines as to whether there are any other service level issues, such as service level agreement (SLA) fulfillment, SLA targets, etc. (decision 650). If there are any other service contract issues, then decision 650 branches to the 'yes' branch whereupon the process determines whether to terminate container(s) and terminates the container(s) accordingly as discussed above. On the other hand, if there are not any other service level issues, then decision 650 branches to the 'no' branch.

The process determines as to whether to continue enforcing service levels of the container group (decision 690). If the process should continue, then decision 690 branches to the 'yes' branch which loops back to continue monitoring distributed ledger 390's status data that is entered by the containers. This looping continues until the process should terminate, at which point decision 690 branches to the 'no' branch exiting the loop. FIG. 6 processing thereafter ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
building an encapsulated service image that encapsulates one or more service contracts comprising service level information corresponding to a service level;
instantiating a container from the encapsulated service image, wherein the container comprises the service level information;
deploying the container into a container group;
writing status data into a memory area by each of a plurality of containers deployed into the container group, wherein the container is included in the plurality of containers;
determining that the status data indicates a violation to the service level based on analyzing the service level information against the status data; and
performing a service-related action to enforce the service level in the container group based on the determining, wherein the service-related action comprises terminating at least one of the plurality of containers and is performed autonomously within the container group.

2. The method of claim 1 wherein both the service level information is analyzed, and the service-related action is performed, by a process internal to the container group and is devoid of assistance from an external process external to the container group.

3. The method of claim 2 wherein the process executes on an entity selected from the group consisting of the container and a daemon executing within the container group.

4. The method of claim 1 wherein the status data is selected from the group consisting of a number of sessions per container, a time to live (TTL) per session, a time to live (TTL) per container, and a membership count by container group.

5. The method of claim 1 further comprising:
creating one or more configuration objects from the one or more service contracts;
storing the one or more configuration objects in the memory area; and
extracting the service level information from the one more configuration objects to perform the analyzing against the status data.

6. An information handling system comprising:
one or more processors;
a memory coupled to at least one of the processors; and
a set of computer program instructions stored in the memory and executed by at least one of the processors in order to perform actions of:
building an encapsulated service image that encapsulates one or more service contracts comprising service level information corresponding to a service level;
instantiating a container from the encapsulated service image, wherein the container comprises the service level information;
deploying the container into a container group;
writing status data into a memory area by each of a plurality of containers deployed into the container group, wherein the container is included in the plurality of containers;
determining that the status data indicates a violation to the service level based on analyzing the service level information against the status data; and
performing a service-related action to enforce the service level in the container group based on the determining, wherein the service-related action comprises terminating at least one of the plurality of containers and is performed autonomously within the container group.

7. The information handling system of claim 6 wherein both the service level information is analyzed, and the service-related action is performed, by a process internal to the container group and is devoid of assistance from an external process external to the container group.

8. The information handling system of claim 7 wherein the process executes on an entity selected from the group consisting of the container and a daemon executing within the container group.

9. The information handling system of claim 6 wherein the status data is selected from the group consisting of a number of sessions per container, a time to live (TTL) per session, a time to live (TTL) per container, and a membership count by container group.

10. The information handling system of claim 6 wherein at least one of the one or more processors perform additional actions comprising:
   creating one or more configuration objects from the one or more service contracts;
   storing the one or more configuration objects in the memory area; and
   extracting the service level information from the one more configuration objects to perform the analyzing against the status data.

11. A computer program product stored in a computer readable storage medium, comprising computer program code that, when executed by an information handling system, causes the information handling system to perform actions comprising:
   building an encapsulated service image that encapsulates one or more service contracts comprising service level information corresponding to a service level;
   instantiating a container from the encapsulated service image, wherein the container comprises the service level information;
   deploying the container into a container group;
   writing status data into a memory area by each of a plurality of containers deployed into the container group, wherein the container is included in the plurality of containers;
   determining that the status data indicates a violation to the service level based on analyzing the service level information against the status data; and
   performing a service-related action to enforce the service level in the container group based on the determining, wherein the service-related action comprises terminating at least one of the plurality of containers and is performed autonomously within the container group.

12. The information handling system of claim 11 wherein both the service level information is analyzed, and the service-related action is performed, by a process internal to the container group and is devoid of assistance from an external process external to the container group, and wherein the process executes on an entity selected from the group consisting of the container and a daemon executing within the container group.

13. The computer program product of claim 11 wherein the status data is selected from the group consisting of a number of sessions per container, a time to live (TTL) per session, a time to live (TTL) per container, and a membership count by container group.

14. The computer program product of claim 11 wherein at least one of the one or more processors perform additional actions comprising:
   creating one or more configuration objects from the one or more service contracts;
   storing the one or more configuration objects in the memory area; and
   extracting the service level information from the one more configuration objects to perform the analyzing against the status data.

* * * * *